Figure 1:
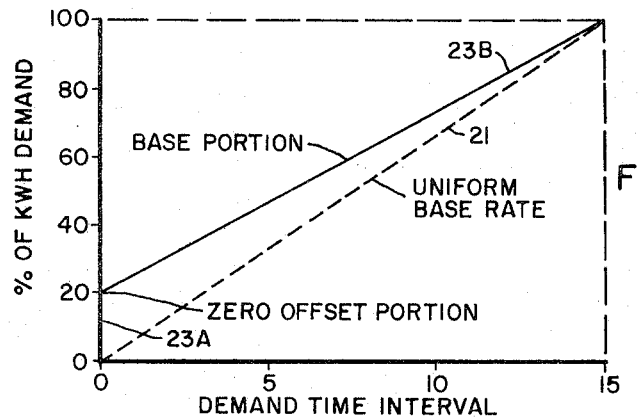

Jan. 3, 1967 W. L. WILLIAMS 3,296,452
LOAD REGULATION
Filed Sept. 16, 1963 4 Sheets-Sheet 1

WITNESSES:
Bernard R. Gieguay
Edwin L. Bassler

INVENTOR
Wallace L. Williams
BY C. L. Freedman
ATTORNEY

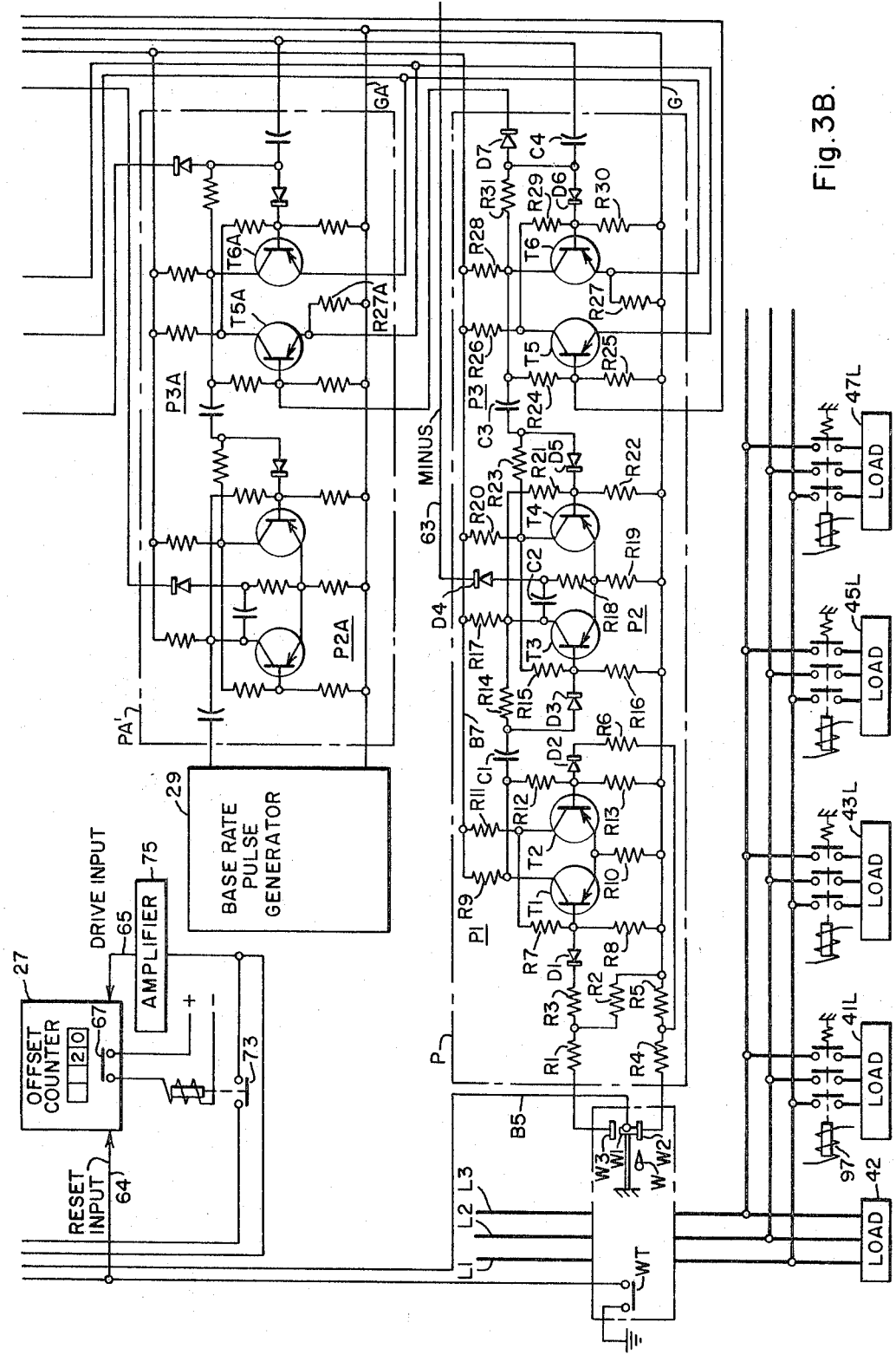

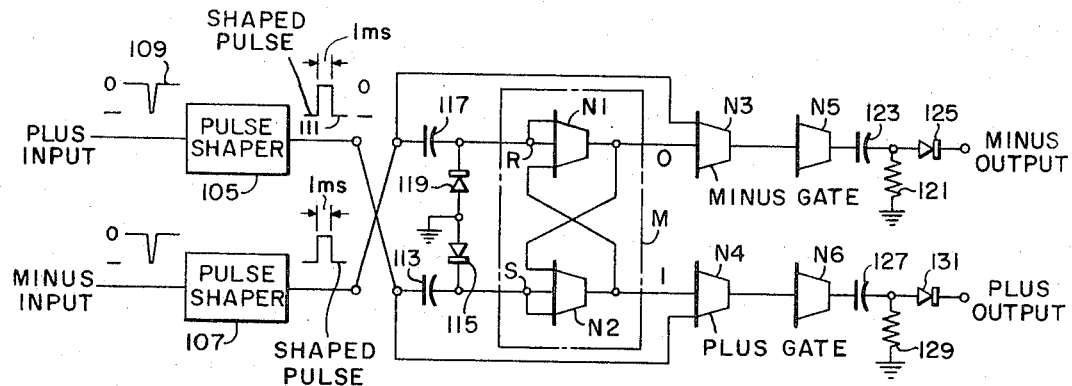
Fig. 4.
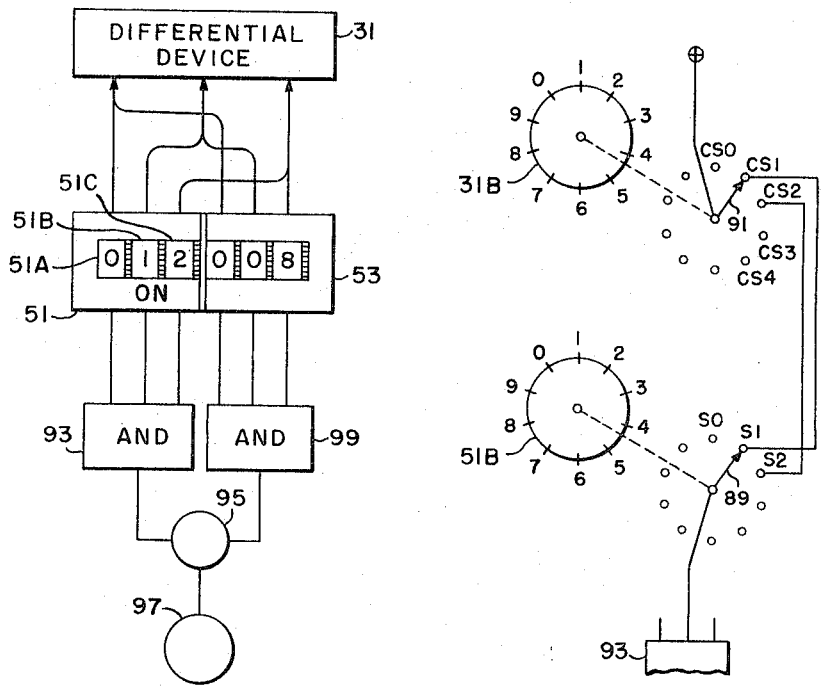
Fig. 5.
Fig. 6.

United States Patent Office 3,296,452
Patented Jan. 3, 1967

3,296,452
LOAD REGULATION
Wallace L. Williams, Raleigh, N.C., assignor to Westinghouse Electric Corporation, Pittsburgh, Pa., a corporation of Pennsylvania
Filed Sept. 16, 1963, Ser. No. 309,253
17 Claims. (Cl. 307—62)

This invention relates to apparatus and method for the regulation and control of loads and it has particular relation to the maintenance of electric loads within the limits on which demand rates are based.

In the electrical industry charges for electric energy frequently are based on the maximum demand for electric energy over a billing period. To determine such charges a maximum demand meter is employed for indicating the maximum electric energy consumption of a load over a demand interval which may be of the order of fifteen minutes and which occurs during a billing period such as one month.

In order to maintain the charges at a reasonable level it is desirable to maintain the load below a predetermined maximum demand. On the other hand, for efficient operation, it is desirable generally to permit energization of the load at the maximum value permitted by the predetermined maximum demand.

In accordance with the invention, a load curve or pattern is established below which the load is to be maintained. For such a curve the energy consumed by the load may increase uniformly from zero at the beginning of a demand interval to the maximum demand value at the conclusion of the demand interval.

In accordance with a preferred embodiment of the invention the load curve or pattern is offset adjacent its zero position to permit increased energization of the load during the initial part of the demand interval. During the remainder of the interval the load curve or pattern is adjusted to maintain the energy consumption within the predetermined maximum demand for the interval.

In accordance with the invention, the load curve or pattern and the energy consumption are represented by pulses.

Provision is made for preventing errors in measurement due to coincidence of pulses.

In one aspect of the invention pulses are paired when possible in order to minimize wear on the apparatus involved. Thus, if two pulses have equal and opposite effects on measuring equipment these pulses are cancelled and the measuring equipment does not see them.

The invention also contemplates the provision of an alarm to indicate when the energy consumption of the load is approaching the load curve or pattern too closely. The invention also may provide for automatic load control to maintain the load within the limits determined by the measuring equipment.

It is therefore an object of the invention to provide improved apparatus useful for maintaining electric loads within certain limits.

It is another object of the invention to provide improved apparatus for mintaining the maximum demand of an electric load within a predetermined limit.

It is a further object of the invention to provide apparatus for maintaining a load within a predetermined maximum demand over a demand interval while permitting power consumption by the load over the first part of the interval at a rate greater than the average rate for the interval.

It is also an object of the invention to provide an improved method for controlling loads.

Figure 2:
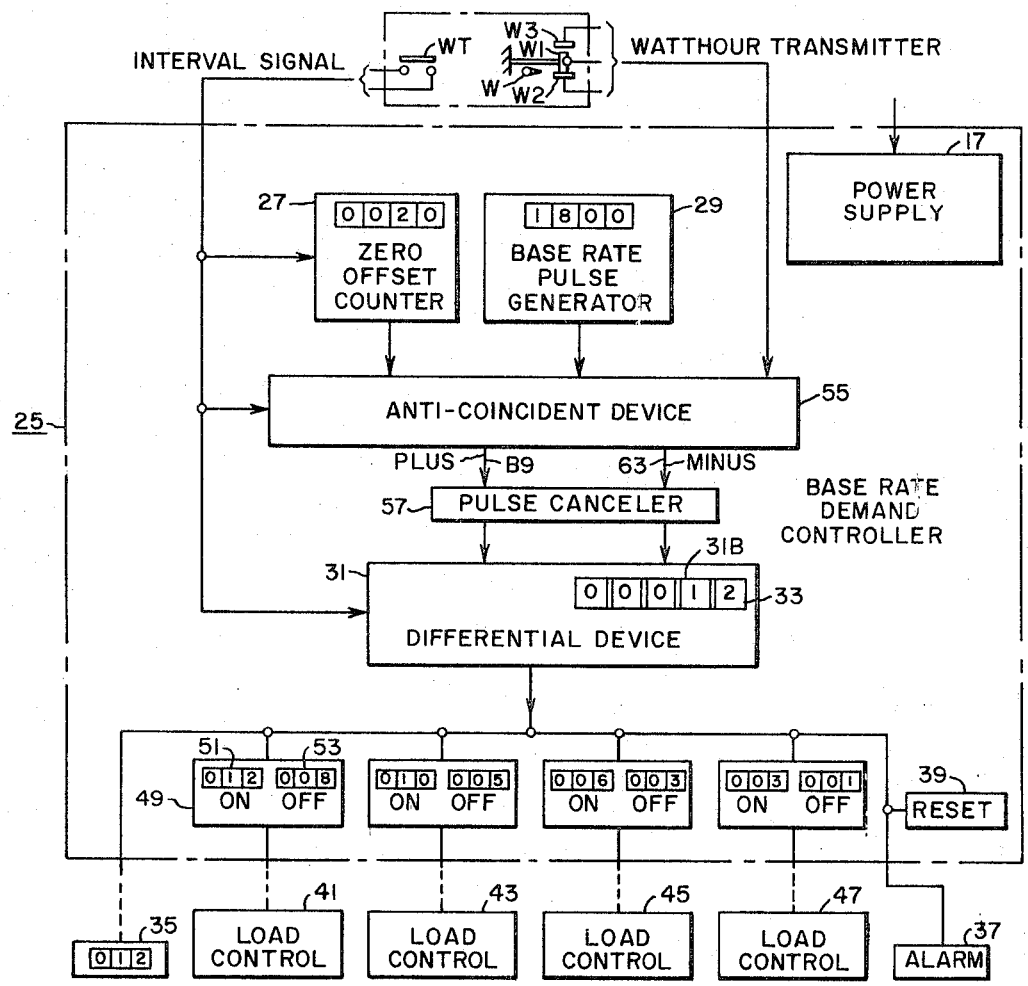
Figure 3A:
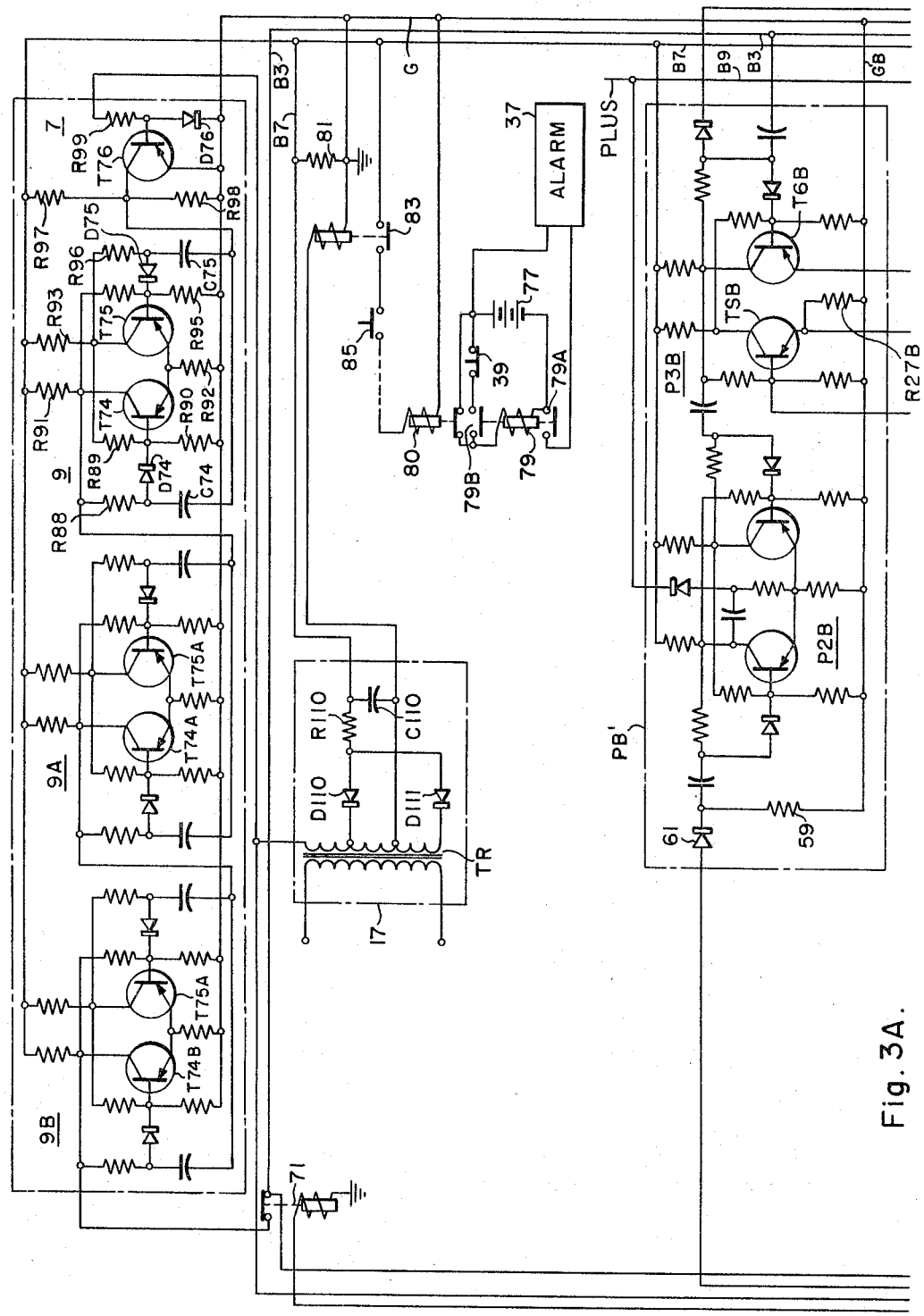

Other objects of the invention will be apparent from the following description taken in conjunction with the accompanying drawings in which:

FIGURE 1 is a graphical representation of curves useful in describing the invention;
FIG. 2 is a block diagram of a load controller embodying the invention.
FIGS. 3A and 3B are a diagrammatic representation of certain components shown in block form in FIG. 2.
FIG. 4 is a diagrammatic representation of a pulse canceller employed in the system of FIG. 2.
FIG. 5 is a showing in block diagram form of an output circuit suitable for the system of FIG. 2; and
FIG. 6 is a schematic view showing an output circuit detail suitable for the system of FIG. 2.

In FIGURE 1 curves are shown on Cartesian coordinates in which abscissas represent minutes or time in a demand interval which will be assumed to be of 15 minutes duration. Ordinates represent percent of kilowatt-hour demand. Thus an ordinate of 100% represents a predetermined kilowatt-hour demand which should not be exceeded in a demand interval. If a constant power were to be supplied to the load such that at the end of a demand interval energy corresponding to an ordinate of 100% would have been supplied to the load, the enery would rise along a straight line 21 from a zero value at the beginning of the interval to a value of 100% at the end of the 15 minute interval. This may be termed a uniform base rate.

In order to avoid excessive charges for energy, energy consumption during the demand interval should not exceed the 100% value. On the other hand, for efficient operation the energy consumption for a demand interval should be close to the 100% value. The importance of such efficiency may be illustrated by reference to the operation of aluminum reduction plants wherein an additional pound of metal is obtained for each 9 kilowatt-hours of energy.

It is possible to so control the load that the power supplied to the load at any instant is below the value represented by the curve 21. However, for most applications it is desirable to employ a limit curve which differs from the curve 21. A suitable modification is illustrated in FIGURE 1 by a curve which includes a zero-offset portion 23A which extends substantially vertically upwardly at the start of the demand interval and a sloping straight line portion 23B which constitutes a base portion extending from the end of the zero offset portion to the 100% value energy value at the end of the 15 minute demand interval. This would permit the application of power at a rate in excess of that represented by the uniform base rate curve 21 at the beginning of the demand interval. However, the decreased slope of the base portion 23B prevents the energy from exceeding the 100% value in a demand interval. In some applications this offset may decrease the frequency of operation of the control equipment during the early part of the demand interval. This would reduce the maintenance problem on devices such as tap-changing transformers if employed for load control.

For a load having controllable peaks such as that presented by a steel rolling mill a considerable zero offset may be provided. When applied to a steel rolling mill such an offset would permit extensive rolling of billets during the beginning of a demand interval. However, as the energy supplied to the load approached the base portion 23B of FIGURE 1 during the latter part of a demand interval an alarm would be operated or a control would be operated to terminate the rolling of billets during such interval.

FIG. 2 shows a base-rate demand controller 25 which is associated with a watt-hour meter W. The watt-hour meter is represented by the shaft of the watt-hour meter which carries a cam. This cam in rotating moves a movable contact W1 from engagement with a fixed contact W2 into engagement with a fixed contact W3. Continued rotation of the cam restores the movable contact into engagement with the fixed contact W2. Each engagement of the movable contact W1 with one of the fixed contacts W2 and W3 may be employed for producing a "pulse" which is supplied to the base-rate demand controller 25. Alternatively the base-rate demand controller may be responsive to "impulses" each of which is produced by movement of the movable contact W1 from engagement with the fixed contact W2 into engagement with the fixed contact W3 and back into engagement with the fixed contact W2. Such operation of contact devices on watt-hour meters is well known in the art. The term "pulse" is employed to denote either of these types of output.

The watt-hour meter W has associated therewith a timer or clock mechanism WT which produces electric pulses at a rate dependent on a demand interval. For present purposes it will be assumed that the timer mechanism WT defines a demand interval of 15 minutes and thus produces a pulse at 15 minute intervals.

Each pulse from the timer mechanism WT is employed for triggering a zero-offset counter 27 to produce a predetermined number of offset pulses at the beginning of each of the demand intervals. As representative of suitable parameters the zero-offset counter may be adjusted to produce any number of offset pulses between 0 and 9,999 at the beginning of each demand interval.

A base-rate pulse generator 29 is provided for generating pulses at a frequency which may be selected from a substantial range. As representative of suitable parameters the base-rate pulse generator may be adjustable to provide pulses at a frequency selected from a range represented by one pulse every 0.200 second to one pulse every 9.999 seconds in steps of one millisecond.

The outputs of the zero-offset counter and the base-rate pulse generator are combined to provide a curve similar to that represented by the curve portions 23A and 23B of FIGURE 1. Pulses represented by this curve are compared with the pulse output of the watt-hour meter W in order to ascertain whether the watt-hour meter pulse output is approaching a value corresponding to a value determined from the curve. For convenience the pulse outputs of the zero-offset counter and the base-rate pulse generator are referred to as plus outputs whereas the pulse output of the watt-hour meter W is referred to as a minus output.

Conveniently, the difference between the plus outputs and the minus output may be ascertained by a differential device 31. This differential device may be of static construction or of electromechanical construction. In a preferred embodiment of the invention the differential device 31 takes the form of an electromechanical counter which is driven in an up or count-increasing direction by the plus pulses and in a down or count-decreasing direction by the minus pulses. The difference between the plus pulses and the minus pulses is displayed on a register 33. Thus in FIG. 2 a difference of 12 pulses is displayed on the register. At the end of each demand interval the differential device 31 is reset to a zero reading by a signal received from the timing device WT. Resettable differential counters suitable for the device 31 are available.

The output of the differential device 31 is employed for controlling a number of output circuits. Thus, one output circuit extends to a remote indicator 35 for indicating the difference reading of the differential device 31 at a remote point in a conventional manner. A second output circuit extends to an alarm 37 for the purpose of operating an alarm such as a lamp or a buzzer when the differential device 31 is driven by the minus pulses to a reading one pulse below zero or 99,999. As will be pointed out below, the alarm also is utilized for indicating failure of power supplies associated with the equipment. A reset button 39 is employed for resetting the alarm after corrective action has been taken.

The output of the differential device 31 also is employed for operating load controls 41, 43, 45 and 47. Inasmuch as the load control circuits are of similar construction, a discussion of one will suffice.

In order to operate the load control 41 the output of the differential device 31 is supplied to a control unit 49 having an adjustable ON section 51 and an adjustable OFF section 53. The ON section 51 may be adjusted to turn on or connect additional loads to the system when the plus count on the differential device 31 reaches a preselected value. The adjustment conveniently may be effected by thumb wheel switches. In the embodiment of FIG. 2 the ON section 51 is adjusted to connect additional load to the system when the plus count of the differential device reaches a value of 12. In a similar manner the OFF section may be adjusted to disconnect load from the system when the plus difference of the differential device 31 drops to a preselected value. In the embodiment of FIG. 2 the section 53 is adjusted to disconnect load when a plus reading of the differential device 31 drops to a value of 8.

Although pulses from the zero-offset counter 27, the base-rate pulse generator 29 and the watt-hour meter W may be supplied directly to the differential device 31 there is a possibility that two or more of these pulses may occur at the same time. Although such coincidence of pulses may be tolerated in some applications, preferably an anti-coincident device 55 is employed to eliminate errors due to such coincidence of pulses. This anti-coincident device is supplied with plus pulses from the zero-offset counter 27 and the base-rate pulse generator 29. It is provided with minus pulses from the watt-hour meter W. The anti-coincident device delivers a plus pulse for each of the pulses applied by the zero-offset counter and the base-rate pulse generator. It supplies a minus pulse for each of the pulses supplied by the watt-hour meter W. During a resetting operation of the base-rate demand controller a signal is supplied by the timing device WT to the anti-coincident device in order to hold in storage pulses which otherwise might be lost during the resetting operation.

The output of the anti-coincident device 55 may be supplied directly to the differential device 31. This is particularly satisfactory if the differential device is of a high-speed static type. However in a preferred embodiment of the invention the differential device is of a conventional electromechanical type. In order to decrease the operations of the differential device and thus to decrease the maintenance thereof, a pulse canceller 57 preferably is employed for the purpose of eliminating unneeded pulses. This pulse canceller is interposed between the output of the anti-coincident device 55 and the input to the differential device 31. It operates to cancel any pair of successive pulses which includes a plus and a minus pulse derived from the output of the anti-coincident device. However, if first and second plus pulses occur in succession a second pulse is delivered to the differential device 31. Similarly if first and second minus pulses are received in succession from the anti-coincident device the pulse canceller delivers a second minus pulse to the differential device 31. This materially decreases the operations required of the differential device 31. Amplifiers may be located between the pulse canceller and the differential device for the purpose of increasing the amplitude of the pulses supplied to the differential device. The base-rate demand controller also includes a suitable power supply 17 which may be energized from a conventional alternating-current circuit operating at 60 cycles and 120 volts.

The anti-coincident device is illustrated in FIG. 3A and FIG. 3B in association with other components of the base-rate demand controller. In order to simplify the present discussion of the anti-coincident device, it is based on circuits shown in the Booker Patent 3,072,888, which issued January 8, 1963. Each component of the Booker patent which appears in FIGS. 3A and 3B bears the same reference character. The panel P of the Booker patent is reproduced in FIG. 3B. As in the case of the Booker patent the panel P includes an input device P1 which receives pulses from the watt-hour meter W. The input device P1 supplies pulses to the storage device P2 and the storage device is scanned or interrogated at intervals by the interrogating device P3.

The base-rate pulse generator 29 may deliver pulses to a panel similar to the panel PA of the Booker patent. However, the generator is of an electronic type which does not introduce problems of contact bounce. For this reason, a panel PA' is employed in FIG. 3B which is similar to the panel PA of the Booker patent except for the omission of the input device of such patent. By inspection of FIG. 3B it will be noted that the pulses delivered by the generator 29 are applied directly to the storage device P2A.

For similar reasons FIG. 3A employs a panel PB' which is similar to the panel PB of the Booker patent except for the omission of the input device. The panel PB' receives offset pulses developed across a resistor 59 through a rectifier 61.

The outputs of the panels PA' and PB' are delivered to the bus B9 in the manner discussed in the aforesaid Booker patent. Consequently, the bus B9 supplies the plus output pulses from the anti-coincident device. The output pulses of the panel P are delivered to a conductor 63. Consequently, the conductor 63 supplies minus output pulses from the anti-coincident device.

In FIG. 3A the power supply 17 is similar to that shown in the Booker patent and bears the same reference characters. FIG. 3A also reproduces the squaring device 7 and the dividers 9A and 9B which supply timed pulses to the panels P, PA' and PB' in the manner discussed in the Booker patent. As described in this patent, timed pulses are employed for advancing the interrogating devices P3, P3A and P3B for the purpose of interrogating or scanning the storage devices P2, P2A and P2B. The parameters should be such that complete interrogating or scanning cycle is completed within a time shorter than the time between two adjacent pulses applied by the watt-hour meter W the base-rate pulse generator 29 or the zero-offset counter. When so constructed the plus pulse output of the anti-coincident device represents the exact sum of the pulses supplied by the base-rate pulse generator and the zero-offset counter. The anti-coincident device cannot have a minus output pulse coincident with a plus output pulse.

The zero-offset counter shown in FIG. 3B is adjustable as previously indicated to provide the desired number of zero-offset pulses. The counter has a drive input 65 which drives the counter down, a pair of contacts 67 which open when the offset counter reaches a zero reading and a reset input 64 which resets the offset counter to its initial condition. Such counter are known in the art.

Time pulses for driving the zero-offset counted down are derived from the divider 9B through contacts of a stop-scan relay 71 which are closed when the relay is deenergized and dropped out, contacts of a repeater relay 73 which are open when the relay is deenergized and dropped out and an amplifier 75 which supplies amplified timed pulses to the drive input 65. The source of pulses employed for driving the zero-offset counter down also supplies pulses through a rectifier 61 across a resistor 59 of FIG. 3A. When the offset counter is driven down to its zero condition, contacts 67 open to deenergize the repeater relay 73. This relay 73 opens its contacts to interrupt the supply of timed pulses from the divider 9B to the amplifier 75 and to the resistor 59. This signifies that the proper number of zero-offset pulses have been supplied at the beginning of a demand interval. At the beginning of the next interval a time signal from the timing device WT is applied to the reset input 64 to reset the zero-offset counter. The operation of the zero-offset counter then is repeated for the succeeding interval.

As shown in FIG. 3A the alarm 37 is energized from a dependable source of energy represented by a battery 77 through contacts 79A of a relay 79 which are closed when the relay is energized and picked up. The operating coil of the relay 79 is connected across the battery 77 through contacts of a relay 80 which are closed when the relay 80 is deenergized and dropped out. A holding circuit for the relay 79 is established across the contacts of the relay 80 by contacts 79B of the relay 79 in series with contacts of the push-button switch 39. The contacts 79B are closed only when the relay 79 is energized and picked up. The push-button switch is biased into closed condition and is pressed manually to open the holding circuit. The coil of the relay 80 is connected for energization across the busses B7, and G through a series connection of the contacts of relays which are designed to operate under predetermined conditions. For example, the power supply 17 delivers a direct-current output across a load resistor 81 through the operating coil of a relay 83. This relay has contacts which are open when the relay is deenergized and dropped out and which are in the energizing circuit of the relay 79. Thus, a failure of the power supply 17 results in dropout of the relay 83 to assure operation of the alarm 37. The contacts 85 represent contacts in the differential device 31 which open when the differential device is driven by minus pulses to a reading of 99,999. This again assures operation of the alarm 37.

When a pulse is received from the timing device to reset the zero-offset counter and the differential device 31 the stop-scan relay 71 also is energized to interrupt the supply of timed pulses from the divider 9B. The effect of this is to stop the scan or interrogation of the storage devices P2, P2A and P2B. This assures that pulses arriving during the resetting operation will not be lost.

As previously explained the ON section and the OFF section 51 and 53 employed in load control may be provided with adjustable thumb wheel switches. Thus each section may be adjusted to establish the desired control limit. For example, the ON section 51 is provided with three thumb wheels 51A, 51B and 51C each representing one decade. As shown in FIG. 6 when the thumb wheel 51B is positioned to present the numeral 1 in the window a contact segment S1 is positioned to engage a wiper or brush 89. As the thumb wheel 51B rotates it carries the brush or wiper 89 successively into engagement with fixed contact segments S1 to S0 each corresponding to one position of the thumb wheel. Each of these contact segments is connected to a separate one of contact segment CS1 to CS0 in the differential device 31 which are associated with the drum 31B. As the drum 31B rotates it rotates a wiper or brush 91 into successive engagement with the contact segments CS1 to CS0 associated therewith. Thus when the thumb wheel 31B is positioned to expose the numeral 1 through its window the brush or wiper 91 engages the contact segment CS1 which is connected to the contact segment S1 associated with the brush or wiper 89. If the thumb wheel 51B is positioned to expose its numeral 1 through its associated window the brush or wiper 89 is positioned to engage its contact segment S1 to complete a circuit extending from a source of power to the input of an AND unit 93. The AND unit 93 has a similar input for each of the decades of the ON section 51. The three inputs of the AND unit are energized only if the readings of the ON section 51 and the differential device 31 agree. The AND unit provides an output only if such three outputs are energized. When the count on the differential device 31 reaches the value for which the ON section 51 is set (in the present case a count of 12) an output is obtained from the AND unit 93 which energizes a relay 95 for the purpose of picking up a relay 97 to increase the loading of the system. The relay 95 may be of a polarized latching type which remains in an operated condition until it is reset.

Pick up of the relay 97 is utilized to increase the system loading by a predetermined amount. If desired the relay 97 may be a timed relay which, when energized, successively increases the system loading at timed intervals.

When the count on the differential device 31 thereafter drops to a value for which the OFF section 53 is set (in the present example a count of 8) an AND unit 99 is fully energized and produces an output which resets the polarized latching relay 95. This in turn deenergizes the relay 97 to drop or decrease the load on the system.

In FIG. 3B the watt-hour meter W is assumed to be a three-phase watt-hour meter for measuring energy supplied by a three-phase system having line conductors L1, L2 and L3 and operating at a conventional power frequency such as 60 cycles per second. This three-phase system is employed for energizing a load 41L, through the relay 97 and similar loads 43L, 45L and 47L which are controlled by other output circuits of the differential device 31. A load 42 may be permanently connected for energization from the system. Each of the loads may be increased or decreased at desired readings of the differential device 31 in the manner discussed for the load 41L.

The pulse canceller 57 may be of the type disclosed in the James Dobbie Patent 3,040,187, which issued June 19, 1962. However, a desirable pulse canceller is illustrated in FIG. 4, and includes two pulse shapers 105 and 107, and six NOR logic elements of the type discussed in the aforesaid Dobbie patent. The NOR element N1 and N2 are cross-connected to provide a FLIP FLOP or MEMORY logic element M in a manner well understood in the art.

The pulse shaper 105 receives a plus input pulse 109 from the anti-coincident device which is assumed to be a negative-going pulse. Each such pulse represents a brief shift in voltage level from zero to a negative value as illustrated. The pulse shaper 105 converts the input pulse into a shaped pulse 111 which represents a voltage level shift from a negative value to a zero value for a duration of one millisecond. The pulses from the pulse shaper 105 are applied through a capacitor 113 across a rectifier 115 and as a "set" input to the NOR element N2, and as an input to the NOR element N4. It will be noted that the output of the NOR element N2 is connected to input terminals of the NOR element N4 and the NOR element N1.

In an analogous manner the minus pulses are shaped by the pulse shaper 107 and the resulting shaped pulses are applied to the NOR element N3 and through a capacitor 117 as a reset input to the NOR element N1. The output of the NOR element N1 is connected to the NOR elements N3 and N2. A rectifier 119 is polarized as shown across the output of the capacitor 117. The minus output pulses from the NOR element or gate N3 are inverted by the NOR element or inverter N5 and the inverted pulses are applied across a resistor 121 through a capacitor 123. The minus pulses appearing across the resistor then are supplied to the differential device through a rectifier 125 poled as shown. Similarly plus pulses from the NOR element N4 are inverted by the NOR element or inverter N6, and the inverted pulses are applied through a capacitor 127 across a resistor and through a rectifier 131 to the differential device.

As long as plus input pulses are supplied to the pulse canceller, the MEMORY element M remains in "set" condition and supplies a zero first input to the plus gate N4. Each plus input pulse then briefly applies a zero second input to the plus gate N4 to produce a plus output pulse.

Under these conditions the MEMORY element M supplies a "1" input to the minus gate N3 which prevents transmission of pulses through this gate. When the first minus input pulse is thereafter supplied to the pulse canceller it cannot produce a pulse output from the minus gate N3. However the trailing edge of the minus shaped pulse resets the MEMORY element M and the reset MEMORY element then supplies a "0" first input to the minus gate N3. Each successive minus input pulse thereafter supplies a brief minus second input to the minus gate N3 which produces a minus output pulse.

Under these conditions the MEMORY element M supplies a "1" first input to the plus gate N4 which blocks production of pulses thereby. However when a plus input pulse is next applied to the pulse canceller it again "sets" the MEMORY element to permit successive plus input pulses to produce plus output pulses from the plus gate N4.

Thus as long as plus and minus shaped pulses alternate, their trailing edges "set" and "reset" the MEMORY element M alternately to block production of output pulses by the gate.

The pulse shapers 105 and 107 may be of conventional construction. Devices known as "one-shot" or monostable multivibrators are suitable.

Although the invention has been described with reference to certain specific embodiments thereof, numerous modifications falling within the spirit and scope of the invention are possible.

I claim as my invention:

1. In a differentially-responsive device, first input terminal means for receiving a first input at predetermined intervals, second input terminal means for receiving an input from a variable quantity, first pattern means for establishing a first predetermined limit pattern for a variable quantity, second pattern means connected to the first terminal means for establishing a second predetermined limit pattern for a portion of each of said predetermined intervals, and differential means connected to the first input terminal means, the first pattern means and the second pattern means for responding to the difference between said input from a variable quantity and the sum of said limit pattern for each of said predetermined intervals.

2. In a differentially-responsive device, first input terminal means for receiving a first input at predetermined intervals, second input terminal means for receiving an input from a variable quantity, first adjustable pattern for establishing a first adjustable predetermined limit pattern for a variable quantity, second pattern means connected to the first terminal means for establishing a second adjustable predetermined limit pattern for a portion of each of said predetermined intervals, and differential means connected to the first input terminal means, the first pattern means and the second pattern means for responding to the difference between said input from a variable quantity and the sum of said limit patterns for each of said predetermined intervals.

3. In a differentially responsive device, first input terminal means for receiving a first input at predetermined intervals, second input terminal means for receiving an input from a variable quantity, first adjustable pattern means for establishing a first adjustable predetermined limit pattern for a variable quantity, adjustable second pattern means connected to the first terminal means for establishing a second adjustable predetermined limit pattern for a brief beginning portion of each of said predetermined intervals, and differential means connected to the first input terminal means, the first pattern means and the second pattern means for responding to the difference between said input from a variable quantity and the sum of said limit patterns for each of said predetermined intervals.

4. In a pulse-responsive device, first input terminal means for receiving a first input signal at predetermined intervals, second input terminal means for receiving an input from a pulse quantity which pulses at a pattern variable rate, first pattern means for producing first pulses at a predetermined rate, second pattern means for producing second pattern pulses at a predetermined rate, and anti-coincident means connected to the second input terminal means, the first pattern means and the second pattern means; said anti-coincident means having first output means supplying first output pulses at a rate dependent solely on the number of pulses of said variable quantity, said anti-coincident means having second output means supplying second output pulses at a rate dependent solely on the sum of said first and second pattern pulses, each of said first output pulses being spaced in time from the second output pulses.

5. In a pulse-responsive device, first input terminal means for receiving a first input signal at predetermined intervals, second input terminal means for receiving an input from a pulse quantity which pulses at a variable rate, first pattern means for producing first pattern pulses at a predetermined rate, second pattern means for producing second pattern pulses at a predetermined rate, and an anti-coincident means connected to the second input terminal means, the first pattern means and the second pattern means; said anti-coincident means having first storage means connected to the second input terminal means for operation from a reset to a set condition by a pulse derived from said pulse quantity, second storage means connected to the first pattern means for operation from a reset to a set condition by one of said first pattern pulses, third storage means connected to the second pattern means for operation from a reset to a set condition by one of said second pattern pulses, scan means for successively scanning each of the storage means to reset any of the storage means from a set to a reset condition, said anti-coincident means having first output means for delivering first output pulses at a rate dependent on the rate of resetting operations of the first storage means, said anti-coincident means having second output means for delivering second output pulses at a rate dependent on the rate of resetting operations of the combined second and third storage means.

6. In a pulse-resopnsive device, first input terminal means for receiving a first input signal at predetermined intervals, second input terminal means for receiving an input from a pulse quantity which pulses at a variable rate, first pattern means for producing first pattern pulses at a predetermined rate, second pattern means for producing second pattern pulses at a predetermined rate, and an anti-coincident means connected to the second input terminal means, the first pattern means and the second pattern means; said anti-coincident means having first storage means connected to the second input terminal means for operation from a reset to a set condition by a pulse derived from said pulse quantity, second storage means connected to the first pattern means for operation from a reset to a set condition by one of said first pattern pulses, third storage means connected to the second pattern means for operation from a reset to a set condition by one of said second pattern pulses, scan means for successively scanning each of the storage means to reset any of the storage means from a set to a reset condition, said anti-coincident means having first output means for delivering first output pulses at a rate dependent on the rate of resetting operations of the first storage means, said anti-coincident means having second output means for delivering second output pulses at a rate dependent on the rate of resetting operations of the combined second and third storage means, and stop scan means connected to said first input terminal means and said scan means for temporarily stopping the scanning operation in response to each of said first input signals.

7. In a pulse-responsive device, first input terminal means for receiving a first input signal at predetermined intervals, second input terminal means for receiving an input from a pulse quantity which pulses at a variable rate, first pattern means for producing first pattern pulses at a predetermined rate, second pattern means for producing second pattern pulses at a predetermined rate, and anti-coincident means connected to the second input terminal means, the first pattern means and the second pattern means; said anti-coincident means having first output means supplying first output pulses at a rate dependent solely on the number of pulses of said variable quantity, said anti-coincident means having second output means supplying second output pulses at a rate dependent solely on the sum of said first and second pattern pulses, each of said first output pulses being spaced in time from the second output pulses, and differential means connected to said output means for response to the difference between said first and second output pulses.

8. In a pulse-responsive device, first input terminal means for receiving a first input signal at predetermined intervals, second input terminal means for receiving an input from a pulse quantity which pulses at a variable rate, first pattern means for producing first pattern pulses at a predetermined rate, second pattern means for producing second pattern pulses at a predetermined rate, and anti-coincident means connected to the second input terminal means, the first pattern means and the second pattern means; said anti-coincident means having first output means supplying first output pulses at a rate dependent solely on the number of pulses of said variable quantity, said anti-coincident means having second output means supplying second output pulses at a rate dependent solely on the sum of said first and second pattern pulses, each of said first output pulses being spaced in time from the second output pulses, and differential means connected to said output means for response to the difference between said first and second output pulses, and restoring means connected to the first input means for restoring the first pattern means and the differential means to predetermined conditions for each of said input signals.

9. In a pulse-responsive device, first input terminal means for receiving a first input signal at predetermined intervals, second input terminal means for receiving an input from a pulse quantity which pulses at a variable rate, first pattern means for producing first pattern pulses at a predetermined rate, second pattern means for producing second pattern pulses at a predetermined rate, and an anti-coincident means connected to the second input terminal means, the first pattern means and the second pattern means; said anti-coincident means having first storage means connected to the second input terminal means for operation from a reset to a set condition by a pulse derived from said pulse quantity, a second storage means connected to the first pattern means for operation from a reset to a set condition by one of said first pattern pulses, third storage means connected to the second pattern means for operation from a reset to a set condition by one of said second pattern pulses, scan means for successively scanning each of the storage means to reset any of the storage means from a set to a reset condition, said anti-coincident means having first output means for delivering first output pulses at a rate dependent on the rate of resetting operations of the first storage means, said anti-coincident means having second output means for delivering second output pulses at a rate dependent on the rate of resetting operations of the combined second and third storage means, and stop scan means connected to said first input terminal means and said scan means for temporarily stopping the scanning operation in response to each of said first input signals, and differential means connected to said output means for response to the difference between said first and second output pulses, and restoring means connected to the first input means, the first pattern means and the differential means for restoring the first pattern means and the differential means to predetermined conditions for each of said input signals.

10. In a load-control device for maintaining an electrical load within the limits of a maximum demand rate for electric energy, first means for establishing a predetermined pattern quantity representing electric energy relative to time which should not be exceeded by load-to-be-controlled, second means for deriving a load quantity representing the actual electric energy relative to time consumed by an electric load, differential means connected to the first and second means for responding differentially to the pattern and load quantities, and load control means connected to said differential means for operation between a first condition wherein it permits the supply of electric energy to a load and a second condition wherein it blocks the supply of electric energy to a load, said load control means being responsive to said differential means to remain in said first condition for a large difference between said pattern and load quantities, said load control means operating to the second condition when said large difference decreases to a predetermined small difference, and said load-control means operating to said first condition when said small difference increases to a predetermined larger difference which is substantially larger than the small difference.

11. In a load-control device for maintaining an electrical load within the limits of a maximum demand rate for electric energy, first means for establishing a predetermined pattern quantity representing electric energy relative to time which should not be exceeded by load-to-be-controlled, second means for deriving a load quantity representing the actual electric energy relative to time consumed by an electric load, differential means connected to the first and second means for responding differentially to the pattern and load quantities, and load control means connected to said differential means for operation between a first condition wherein it permits the supply of electric energy to a load and a second condition wherein it blocks the supply of electric energy to a load, said load control means being responsive to said differential means to remain in said first condition for a large difference between said pattern and load quantities, said load control means operating to the second condition when said large difference decreases to a predetermined small difference, and said load-control means operating to said first condition when said small difference increases to a predetermined larger difference which is substantially larger than the small difference, said load-control means including means for adjusting the values of said small difference and said larger difference.

12. In a load-control device for maintaining an electrical load within the limits of a maximum demand rate for electric energy, first means for producing input pattern pulses at a rate representing the limit of electric energy which should not be exceeded by load-to-be-controlled, second means for deriving input load pulses having a rate dependent on electric power of an electric load, cancelling means connected to said first and second means to produce a first output dependent on said pattern pulses and a second output dependent on said load pulses, said cancelling means operating to make said outputs unresponsive to pairs of successive input pulses wherein each of said pairs includes one pattern pulse and one load pulse, and load-control means connected to said cancelling means for response to the difference between said outputs.

13. In a pulse-responsive device, first input terminal means for receiving a first input signal at predetermined intervals, second input terminal means for receiving an output from a pulse quantity which pulses at a variable rate, first pattern means for producing first pattern pulses at a predetermined rate, second pattern means for producing second pattern pulses at a predetermined rate, and anti-coincident means having first output means supplying first output pulses at a rate dependent solely on the number of pulses of said variable quantity, said anti-coincident means having second output means supplying second output pulses at a rate dependent solely on the sum of said first and second pattern pulses, each of said first output pulses being spaced in time from the second output pulses, pulse cancelling means connected to said output means, means for producing first control pulses and second control pulses dependent on the second output pulses, said pulse cancelling means responding to each pair of said successive pulses which includes one of the first output pulses and one of the second output pulses for blocking corresponding pulses from said first and second control pulses, and load-control means differentially responsive to said first and second control pulses.

14. In a pulse-responsive device, first input terminal means for receiving a first input signal at predetermined intervals, second input terminal means for receiving an input from a pulse quantity which pulses for receiving an input from a pulse quantity which pulses at a variable rate, first pattern means for producing first pattern pulses at a predetermined rate, second pattern means for producing second pattern pulses at a predetermined rate, and an anti-coincident means connected to the second input terminal means, the first pattern means and the second pattern means; said anti-coincident means having first storage means connected to the second input terminal means for operation from a reset to a set condition by a pulse derived from said pulse quantity, a second storage means connected to the first pattern means for operation from a reset to a set condition by one of said first pattern pulses, third storage means connected to the second pattern means for operation from a reset to a set condition by one of said second pattern pulses, scan means for successively scanning each of the storage means to reset any of the storage means from a set to a reset condition, said anti-coincident means having first output means for delivering first output pulses at a rate dependent on the rate of resetting operations of the first storage means, said anti-coincident means having second output means for delivering second output pulses at a rate dependent on the rate of resetting operations of the combined second and third storage means, stop scan means connected to said first input terminal means and said scan means for temporarily stopping the scanning operation in response to each of said first input signals, differential means connected to said output means for response to the difference between said first and second output pulses, and restoring means connected to the first input means, the first pattern means and the differential means for restoring the first pattern means and the differential means to predetermined conditions for each of said input signals, and means for blocking response of the differential means to each pair of successive ones of said output pulses which includes one of the first output pulses and one of the second output pulses.

15. Apparatus for controlling load which comprises pattern means for producing a series of first pulses which occur at a rate establishing a limit pattern for a load-to-be-controlled, load means for producing a series of second pulses each of which is spaced in time from the first pulses and which occur at a rate corresponding to power taken by the load-to-be-controlled, and adjusting means responsive to the pattern and load means for adjusting the load-to-be-controlled to maintain the rate of said second pulses below that of the first pulses.

16. Apparatus for controlling load which comprises pattern means for producing a first series of first pulses which occur at a rate establishing a limit pattern for a load-to-be-controlled, load means for producing a second series of second pulses at a rate corresponding to power taken by a load-to-be-controlled with each of the second pulses spaced in time from the first pulses, means for deriving from the series of first pulses a third series of third pulses, a means for deriving from the series of second pulses a fourth series of fourth pulses, pairing means for cancelling from the third and fourth series pulses corresponding to each pair of successive pulses which includes a first pulse and a second pulse, and adjusting means responsive to the third and fourth pulses for adjusting the load to be controlled to maintain the rate of the fourth series of pulses below that of the third series of pulses.

17. Apparatus for controlling load which comprises first pattern means for producing a first series of first pulses which occur at a first rate, second pattern means for producing momentarily a first group of second pulses at uniformly spaced intervals of time with each of said second pulses spaced in time from each of said first pulses, resultant pattern means combining said first groups of second pulses with the first series of first pulses to produce a third series of third pulses occurring at a rate which establishes a limit pattern for a load-to-be-controlled, power-dependent means producing a fourth series of fourth pulses each of which is spaced in time from the first and second pulsse and which occur at a rate corresponding to power supplied to the load-to-be-controlled, means for deriving from the third series of third pulses a fifth series of fifth pulses, means for deriving from the fourth series of fourth pulses a sixth series of sixth pulses, means for eliminating from the fifth and sixth series the pulses which would correspond to each pair of successive pulses which includes a third pulse and a fourth pulse, and adjusting means responsive to the fifth and sixth pulses for adjusting the load-to-be-controlled to maintain the rate of said fourth series of pulses within the limit defined by said third series of pulses for each of said intervals of time.

References Cited by the Examiner

UNITED STATES PATENTS

| | | | |
|---|---|---|---|
| 3,014,659 | 12/1961 | Dickinson | 235—150.3 |
| 3,153,733 | 10/1964 | De Bolt et al. | 307—41 X |
| 3,227,865 | 1/1966 | Hoernes | 235—177 X |

ORIS L. RADER, *Primary Examiner.*

T. B. JOIKE, *Assistant Examiner.*